(12) United States Patent
Hibbler et al.

(10) Patent No.: US 7,231,847 B2
(45) Date of Patent: Jun. 19, 2007

(54) AXLE ASSEMBLY WITH THREADED COVER PAN ATTACHMENT AND METHOD OF ASSEMBLY

(75) Inventors: John C. Hibbler, Lake Orion, MI (US); Dale R. Dick, Jr., Warren, MI (US)

(73) Assignee: American Axle & Manufacturing, Inc., Detroit, MI (US)

(\*) Notice: Subject to any disclaimer, the term of this patent is extended or adjusted under 35 U.S.C. 154(b) by 241 days.

(21) Appl. No.: 11/091,911

(22) Filed: Mar. 28, 2005

(65) Prior Publication Data

US 2006/0213318 A1 Sep. 28, 2006

(51) Int. Cl.
*F16H 57/02* (2006.01)
*F16H 57/04* (2006.01)
*F16H 61/00* (2006.01)
*B60K 17/00* (2006.01)

(52) U.S. Cl. .................................. 74/606 R; 180/344
(58) Field of Classification Search ............. 74/606 R, 74/607; 180/344, 346, 378
See application file for complete search history.

(56) References Cited

U.S. PATENT DOCUMENTS

| | | | |
|---|---|---|---|
| 2,056,881 A | 10/1936 | Alden | |
| 2,061,009 A | 11/1936 | Rothrock | |
| 4,905,787 A * | 3/1990 | Morin | 180/209 |
| 5,791,205 A | 8/1998 | Ruppert, Jr. | |
| 5,806,371 A | 9/1998 | Hibbler et al. | |
| 6,001,040 A | 12/1999 | Engle | |

FOREIGN PATENT DOCUMENTS

JP 2000120839 A * 4/2000

\* cited by examiner

*Primary Examiner*—Tisha Lewis
(74) *Attorney, Agent, or Firm*—Harness, Dickey & Pierce, P.L.C.

(57) ABSTRACT

A power transfer device includes an input, a gear set for transferring power from the input to at least one output, a housing and a cover. The housing includes an access aperture sized for receiving the gear set. The access aperture includes a threaded wall. The cover closes the aperture and is threadably engaged with the threaded wall to secure the cover to the housing.

27 Claims, 2 Drawing Sheets

AXLE ASSEMBLY WITH THREADED COVER PAN ATTACHMENT AND METHOD OF ASSEMBLY

BACKGROUND OF THE INVENTION

The present invention relates to automotive vehicle drive trains and, more particularly, to a power transfer device having a cover threadably attached to a housing.

Vehicular power transfer devices are typically operable to transfer power from an input through a gear set to at least one output. One type of power transfer device is a driving axle assembly. Driving axle assemblies are typically constructed to include a carrier housing rotatably supporting a gearset such as a differential assembly. The carrier housing includes an access aperture to allow the pinion gear and the differential assembly to be positioned within the carrier housing. Some assemblies include a cover pan typically constructed from stamped steel to close the access aperture and maintain lubricating fluid within the carrier housing. The cover pan typically includes a radially extending flange with many fastener apertures extending through the flange. Commonly known carrier housings include a corresponding number of tapped holes spaced about the periphery of the access aperture. Threaded fasteners are disposed through the fastener apertures of the cover pan and threadingly engaged with the carrier housing to sealingly couple the cover pan to the carrier housing.

The costs to create such a sealed connection between the cover pan and the carrier housing may be prohibitive. Specifically, it is costly to drill and tap a plurality of precisely positioned holes in the carrier housing. Furthermore, a substantial tooling expense exists to handle the fasteners and consistently apply a desired torque to the fasteners. Typically, a multi-spindle nut runner would simultaneously apply torque to the fasteners. Furthermore, difficulties may arise in attempting to create a seal between the flange of the cover pan and a face of the carrier housing. Surface finish and flatness characteristics of the mating surfaces must be properly controlled. Lastly, the known flange attachment method used to couple the cover pan to the carrier housing typically does not provide a load path through the cover pan. Accordingly, the carrier housing must be designed to transfer operating loads while having a relatively large access aperture.

Therefore, a need in the art exists for an axle assembly which may exhibit improved cover sealing and may be assembled in a more cost-effective manner.

SUMMARY OF THE INVENTION

In one form, the present invention provides a power transfer device including an input, a gear set for transferring power from the input to at least one output, a housing and a cover. The housing includes an access aperture sized for receiving the gear set. The access aperture includes a threaded wall. The cover closes the aperture and is threadably engaged with the threaded wall to secure the cover to the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is directed to a power transmission device having an input, a gear set for transferring power from the input to at least one output, a housing and a cover. The housing includes an aperture sized to receive the gear set. The gear set is rotatably supported within the housing. A threaded cover pan threadingly engages the housing and closes the aperture after the gear set has been installed therein.

The following description of the preferred embodiment is merely exemplary in nature and is in no way intended to limit the invention, its application, or uses. While an axle assembly is depicted in the figures as an exemplary power transfer device, other power transfer devices such as transmissions, power take offs, transfer cases, power transfer units and the like are within the scope of the present invention.

Figure 1:
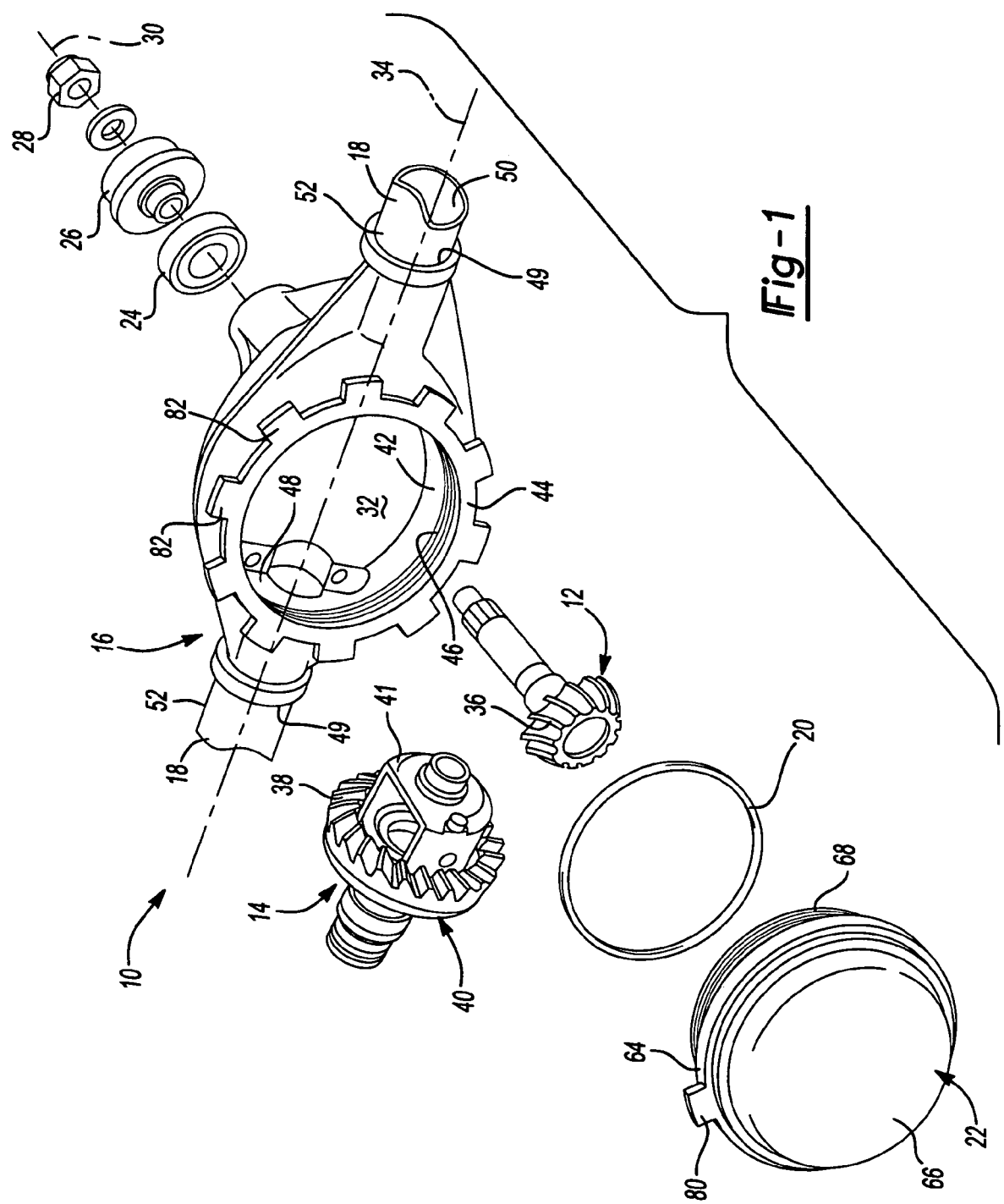
FIG. 1 is an exploded perspective view of an axle assembly of the present invention.
Figure 2:
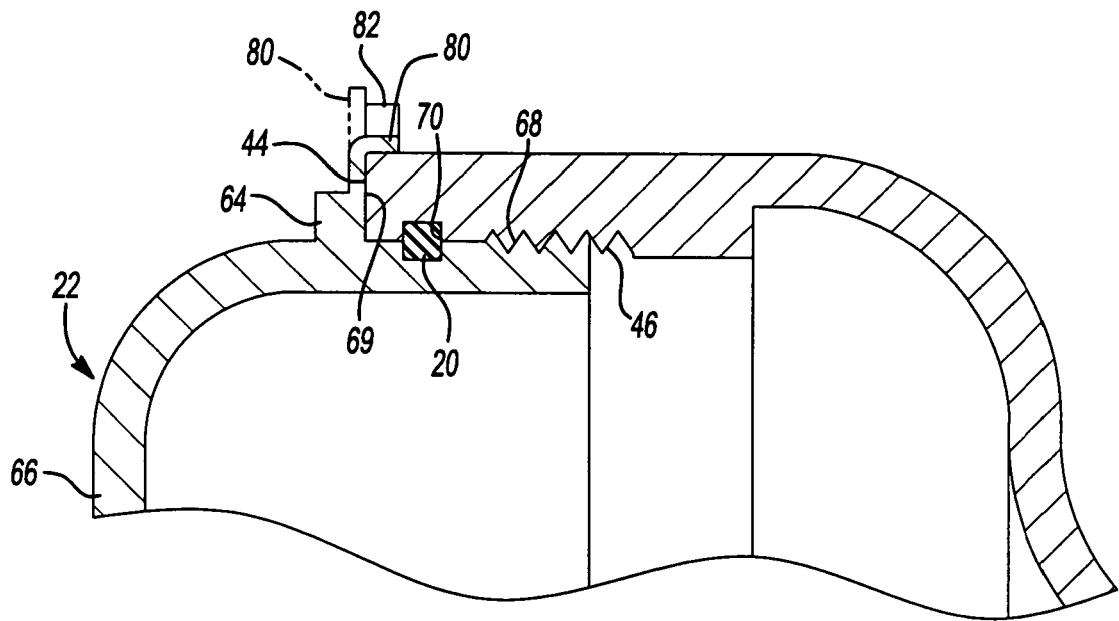
FIG. 2 is a cross-sectional side view of a portion of the axle assembly depicted in FIG. 1.

With reference to FIGS. 1 and 2 of the drawings, an axle assembly constructed in accordance with the teachings of the present invention is generally identified by reference numeral 10. Axle assembly 10 is shown to include a pinion gear 12, a differential assembly 14, a carrier housing 16, a pair of axle housings 18, a seal 20, and a cover 22. Pinion gear 12 is conventionally operable for receiving a driveline torque input from a driveshaft (not shown). Pinion gear 12 transmits torque to differential assembly 14 where the torque is diverted to a pair of axle shafts (not shown).

A bearing 24 supports pinion gear 12 for rotation about a first axis 30 within a cavity 32 of carrier housing 16. A yoke 26 and nut 28 are coupled to pinion gear 12 to facilitate a driving connection between pinion gear 12 and a source of drive torque (not shown). Carrier housing 16 supports differential assembly 14 for rotation within carrier cavity 32 about a second axis 34. Teeth 36 of pinion gear 12 meshingly engage teeth 38 of a ring gear 40. Ring gear 40 is fixed to a differential case 41 of differential assembly 14. Accordingly, drive torque may be transmitted through the pinion gear 12 and ring gear 40. Carrier housing 16 includes an access aperture 42 for receiving differential assembly 14. Access aperture 42 terminates at a face 44. Access aperture 42 includes a thread 46 formed on an inner wall 48 of carrier housing 16.

Carrier housing 16 includes a pair of axle apertures 49. Axle housings 18 are generally tubular structures having a hollow interior 50. The proximal ends 52 of axle housings 18 are coupled to carrier housing 16 at axle apertures 49 such that the hollow interior 50 of the axle housings 18 is in fluid communication with carrier cavity 32.

Cover 22 may be formed by stamping, casting or molding processes to include a flange portion 64, a contoured portion 66 and a threaded portion 68. Threaded portion 68 is threadably engaged with thread 46 formed on carrier housing 16. During assembly of axle assembly 10, cover 22 is rotated until a first surface 69 of flange portion 64 engages face 44 of carrier housing 16. Seal 20, which may be shaped as an o-ring, is positioned within an annular groove 70 formed adjacent to threaded portion 68. When cover 22 is coupled to carrier housing 16, seal 20 is compressed between carrier housing 16 and cover 22 to limit ingress of contaminants and/or egress of lubricant from carrier cavity 32. Contoured portion 66 is configured in a manner which prevents cover 22 from contacting differential assembly 14 when cover 22 is coupled to carrier housing 16.

In the particular embodiment illustrated in FIGS. 1 and 2, a tab 80 radially outwardly extends from flange portion 64 of cover 22. Tab 80 is operable to be bent at approximately 90 degrees from its initial orientation and positioned within one of the gaps formed between two of a plurality of lugs 82 extending from carrier housing 16. Tab 80 and lugs 82 cooperate to restrict relative rotation of cover 22 relative to carrier housing 16 once access aperture 42 has been closed. Tab 80 may be bent back to its original position (shown in phantom line representation in FIG. 2) to allow removal of cover 22 from axle assembly 10 should service to the differential assembly 14 be required.

Figure 3:
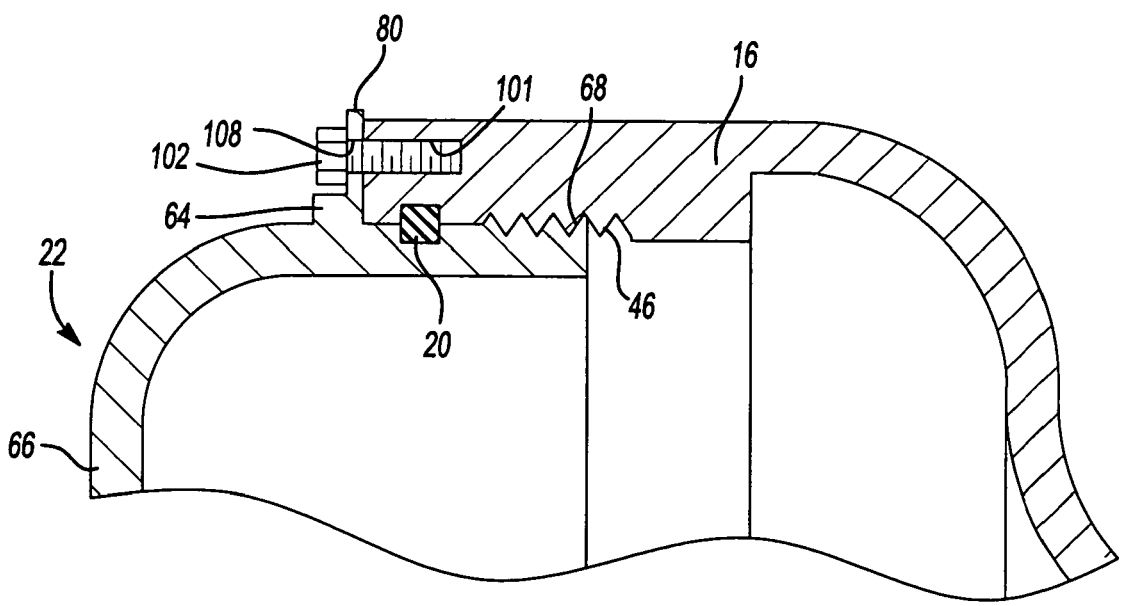
FIG. 3 is a partial cross-sectional view depicting an alternate embodiment anti-rotation device.

It should be appreciated that any number of anti-rotational devices may be implemented to restrict rotation of cover 22 relative to carrier housing 16 without departing from the scope of the present invention. FIG. 3 depicts an alternate embodiment device for restricting rotation. Specifically, it is contemplated that tab 80 or another portion of cover 22 include a fastener aperture 100. Once cover 22 has been coupled to carrier housing 16, an operator forms a hole 101 in carrier housing 16 that is sized to accept a thread forming fastener 102 as shown in FIG. 3. Fastener 102 extends through fastener aperture 100 and is threadably engaged with carrier housing 16 to restrict rotation of cover 22 relative to carrier housing 16. Fastener 102 may be removed to de-couple cover 22 from carrier housing 16.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly comprising:
   a differential assembly;
   a carrier housing having an access aperture for receiving said differential assembly, said access aperture including a threaded wall, said carrier housing including a plurality of spaced apart protrusions; and
   a cover for closing said access aperture, said cover including a threaded portion operable to threadingly engage said threaded wall to secure said cover to said carrier housing and enable ready removal of said cover, said cover including an outwardly extending bendable tab, said bendable tab being selectively positioned adjacent to at least one of said plurality of protrusions to restrict relative rotation between said cover and said carrier housing.

2. The axle assembly of claim 1 wherein said carrier housing rotatably supports said differential assembly.

3. The axle assembly of claim 2 wherein said carrier housing rotatably supports a pinion gear drivingly engaged with a ring gear fixed to said differential assembly.

4. The axle assembly of claim 3 wherein said access aperture is positioned to allow said differential assembly to be inserted within said carrier housing by translating said differential assembly along a path substantially parallel to an axis of rotation of said pinion gear.

5. The axle assembly of claim 1 further including an axle housing coupled to said carrier housing such that an interior of said axle housing and said carrier housing are in fluid communication with one another.

6. The axle assembly of claim 1 wherein said protrusions are integral with a body of said carrier housing, said body encompassing at least a portion of said differential.

7. The axle assembly of claim 1 wherein said threaded wall defines the periphery of said access aperture.

8. In an axle assembly having a carrier housing and a differential assembly, said carrier housing having a threaded access aperture for receiving said differential assembly, the axle assembly including a cover for closing said access opening, said cover including a thread selectively engageable with said threaded access aperture to close said access aperture and secure said cover to said carrier housing, said cover including a flange engageable with said carrier housing to limit the axial travel of said cover relative to said carrier housing and a deformable tab selectively engageable with said carrier housing to restrict rotation of said cover relative to said carrier housing.

9. The axle assembly of claim 8 further including a fastener interconnecting said cover and said carrier housing, said fastener restricting rotation of said cover relative to said carrier housing.

10. The axle assembly of claim 9 wherein said fastener is threaded and extends through an unthreaded aperture formed in said cover.

11. The axle assembly of claim 10 wherein said fastener is a thread forming fastener engageable with an unthreaded aperture formed in said carrier housing, said thread forming fastener being operable to form a thread in said unthreaded aperture of said carrier housing.

12. The axle assembly of claim 8 wherein said carrier housing includes a plurality of spaced apart projections, said deformable tab being positioned between two of said projections.

13. The axle assembly of claim 8 wherein said carrier housing rotatably supports a pinion gear and said differential assembly, said pinion gear being in driving engagement with a ring gear secured to said differential assembly.

14. A method of assembling an axle assembly having a carrier assembly, a differential assembly and a cover, the method comprising:
    inserting the differential assembly through an access aperture formed in the carrier housing;
    rotatably supporting the differential assembly in the carrier housing;
    threadably engaging the cover with the carrier housing to close the access aperture; and
    restricting the cover from rotating relative to the carrier housing after the access aperture has been closed by deforming a tab extending from the cover to a position adjacent a projection extending from the carrier housing.

15. The method of claim 14 further including rotating the cover in threaded engagement with the carrier housing to translate a flange of the cover into engagement with the carrier housing.

16. The method of claim 14 further including compressing a seal between the cover and the carrier housing.

17. The method of claim 14 wherein restricting the cover from rotating includes positioning a fastener in an aperture extending through the cover and threadably engaging said fastener with the carrier housing.

18. The method of claim 14 further including rotatably supporting a pinion gear by the carrier housing and drivingly engaging the pinion gear with a ring gear fixed to the differential assembly.

19. The method of claim 18 wherein inserting the differential assembly through the access aperture includes translating the differential assembly along a path substantially parallel to an axis of rotation of the pinion gear.

20. A power transfer device comprising:
an input;
a gear set operable to transfer power from said input to at least one output;
a housing having a plurality of spaced apart protrusions and an access aperture sized for receiving said gear set, said access aperture including a threaded wall; and
a cover for closing the access aperture, said cover including a threaded portion operable to threadingly engage said threaded wall to secure said cover to said housing and enable ready removal of said cover and a bendable tab selectively positioned adjacent to at least one of said plurality of protrusions to restrict relative rotation between said cover and said housing.

21. The power transfer device of claim 20 wherein said housing rotatably supports said gear set.

22. The power transfer device of claim 21 wherein said housing rotatably supports a pinion gear drivingly engaged with a ring gear fixed to a differential assembly.

23. The power transfer device of claim 20 wherein said power transfer device is a transfer case.

24. The power transfer device of claim 20 wherein said power transfer device is a driving axle assembly.

25. An axle assembly comprising:
a carrier housing defining a cavity and having an access opening with an inner wall portion having internal threads formed thereon and an end wall portion from which a plurality of lugs extend;
a differential assembly rotatably supported within said cavity of said carrier housing; and
a cover for closing said access opening, said cover including a cylindrical portion having external threads formed thereon and a flange portion having a tab, said external threads of said cover engage said internal threads of said carrier housing and said tab is deformed so as to extend between two of said lugs so as to restrict rotation of said cover relative to said carrier housing.

26. The axle assembly of claim 25 wherein said cover is threaded onto said carrier housing until its flange portion engages said end wall portion of said carrier housing.

27. The axle assembly of claim 25 wherein said lugs extend radially outwardly from said end wall portion of said carrier housing and are equal spaced apart, and wherein said tab is a bendable member positioned within a gap defined between any two adjacent lugs.

\* \* \* \* \*